United States Patent [19]

Stine

[11] Patent Number: 5,398,563

[45] Date of Patent: Mar. 21, 1995

[54] COMPOUND TRANSMISSION HAVING FOUR SPEED AUXILIARY CONSTRUCTION

[75] Inventor: Alan C. Stine, Kalamazoo, Mich.

[73] Assignee: Eaton Corporation, Cleveland, Ohio

[21] Appl. No.: 62,241

[22] Filed: May 14, 1993

[51] Int. Cl.$^6$ ............................................. F16H 3/08
[52] U.S. Cl. ........................................ 74/331; 74/745
[58] Field of Search .................. 74/329, 331, 333, 745

[56] References Cited

U.S. PATENT DOCUMENTS

| | | |
|---|---|---|
| 2,637,221 | 5/1953 | Backus . |
| 2,637,222 | 5/1953 | Backus . |
| 3,105,395 | 10/1963 | Perkins . |
| 3,283,613 | 11/1966 | Perkins . |
| 3,335,616 | 8/1967 | Perkins . |
| 3,648,546 | 3/1972 | McNamara et al. . |
| 4,152,949 | 5/1979 | Vandervoort et al. ............... 74/331 |
| 4,269,077 | 5/1981 | Vandervoort ........................ 74/331 |
| 4,290,515 | 9/1981 | Bogema et al. . |
| 4,440,037 | 4/1984 | Foxton et al. . |
| 4,527,447 | 7/1985 | Richards . |
| 4,640,145 | 2/1987 | Vandervoort ........................ 74/331 |
| 4,754,665 | 7/1988 | Vandervoort . |
| 4,901,600 | 2/1990 | Wilson . |
| 4,944,197 | 7/1990 | Stine et al. . |
| 4,974,468 | 12/1990 | Reynolds et al. . |
| 5,000,060 | 3/1991 | Reynolds et al. . |

*Primary Examiner*—Michael Koczo
*Attorney, Agent, or Firm*—Brooks & Kushman

[57] ABSTRACT

A compound transmission comprising a main section connected in series with an auxiliary section is disclosed. The auxiliary section includes a splitter clutch rotatable with a main section mainshaft, and an output shaft having a splitter gear and a reduction gear rotatably mounted thereon. An auxiliary drive gear is rotatably mounted on an extension of the splitter gear. A pair of auxiliary section countershafts have first, second and third countershaft gears rotationally fixed thereto and rotatably engaged with the auxiliary drive gear, splitter gear and reduction gear, respectively. A synchronized range clutch rotatable with the output shaft has a first position for coupling the reduction gear to the output shaft to provide low range ratios, and a second position for coupling the splitter gear to the output shaft to provide high range ratios. The splitter clutch has a first position for coupling the mainshaft to the splitter gear and a second position for coupling the mainshaft to the auxiliary drive gear.

21 Claims, 3 Drawing Sheets

COMPOUND TRANSMISSION HAVING FOUR SPEED AUXILIARY CONSTRUCTION

TECHNICAL FIELD

The present invention relates to compound transmissions including a multispeed main transmission section connected in series with a multispeed auxiliary transmission section, and in particular to such a compound transmission having a combined range and splitter type auxiliary transmission section.

BACKGROUND ART

Compound change gear transmissions of the type having one or more auxiliary sections connected in series with a main transmission section are known in the prior art. Briefly, by utilizing main and auxiliary transmission sections connected in series, assuming proper sizing of the ratio steps, the total of available transmission ratios is equal to the product of the main and auxiliary section ratios. By way of example, a compound change gear transmission comprising a four (4) speed main section connected in series with a three (3) speed auxiliary section will theoretically provide twelve (4×3=12) available ratios.

Auxiliary transmission sections are of three general types: range type, splitter type or combined range/splitter type. In compound transmissions having a range type auxiliary section, the ratio step or steps are greater than the total ratio coverage of the main transmission section and the main section is shifted progressively through its ratios in each range. Examples of compound transmissions having range type auxiliary sections may be seen by reference to U.S. Pat. No. 3,105,395; U.S. Pat. No. 2,637,222; and U.S. Pat. No. 2,637,221, the disclosures of which are hereby incorporated by reference.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having splitter type auxiliary sections may be seen by reference to U.S. Pat. No. 4,290,515; U.S. Pat. No. 3,799,002; U.S. Pat. No. 4,440,037; and U.S. Pat. No. 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing the main section ratios to be split in at least one range.

Examples of a compound transmission having a single combined range/splitter type auxiliary section may be seen by reference to U.S. Pat. No. 3,283,613 and U.S. Pat. No. 3,648,546, the disclosures of which are hereby incorporated by reference. Eaton also produces the "Super 10" compound transmission which has a 2+1 main section and an auxiliary section having both range and splitter gears. All three forward ratios are used in the low range, while two forward ratios are repeated in the high range. This results in a standard 5 speed shift pattern, see U.S. Pat. No. 4,974,468; U.S. Pat. No. 4,944,197; and U.S. Pat. No. 4,754,665, the disclosures of which are incorporated herein by reference.

Another example of a combined range and splitter type compound transmission is the "Ecosplit" model of transmission sold by Zahnradfabrik Friedrichshafen Aktiengeselshaft of Friedrichshafen, Germany, which utilizes a separate splitter auxiliary section in front of, and a separate range auxiliary section behind, the main transmission section. Still another example is the RMO-13-145A thirteen speed transmission sold by Rockwell Corporation, in which the high range forward ratios are split.

It should be noted that the terms main and auxiliary section are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forward speed ratios, which allows selection of a neutral position, which contains the reverse ratio(s) and/or which is shifted (in manual or semiautomatic transmissions) by manipulation of a shift bar or shift rail or shift shaft/shift finger assembly as opposed to master/slave valve/cylinder arrangements or the like.

SUMMARY OF THE INVENTION

The present invention is a compound transmission comprising a main section connected in series with an auxiliary section providing four selectable ratios. The auxiliary section includes a splitter clutch rotatable with a main section mainshaft, and an output shaft generally coaxial with the mainshaft and having a splitter gear and a reduction gear rotatably mounted thereon. An auxiliary drive gear is rotatably mounted on an extension of the splitter gear. A pair of auxiliary section countershafts have first, second and third countershaft gears rotationally fixed thereto and rotatably engaged with the auxiliary drive gear, splitter gear and reduction gear, respectively. A synchronized range clutch rotatable with the output shaft has a first position for coupling the reduction gear to the output shaft to provide low range ratios, and a second position for coupling the splitter gear to the output shaft to provide high range ratios. The splitter clutch has a first position for coupling the mainshaft to the splitter gear and a second position for coupling the mainshaft to the auxiliary drive gear.

Accordingly, it is an object of the present invention to provide a new and improved compound transmission of the type described above having a three layer, four-speed auxiliary transmission section of the combined range and splitter type.

This and other objects and advantages of the present invention will become apparent from a reading of the detailed description of the preferred embodiment taken in connection with the drawings.

DESCRIPTION OF THE PREFERRED EMBODIMENT

Figure 1:
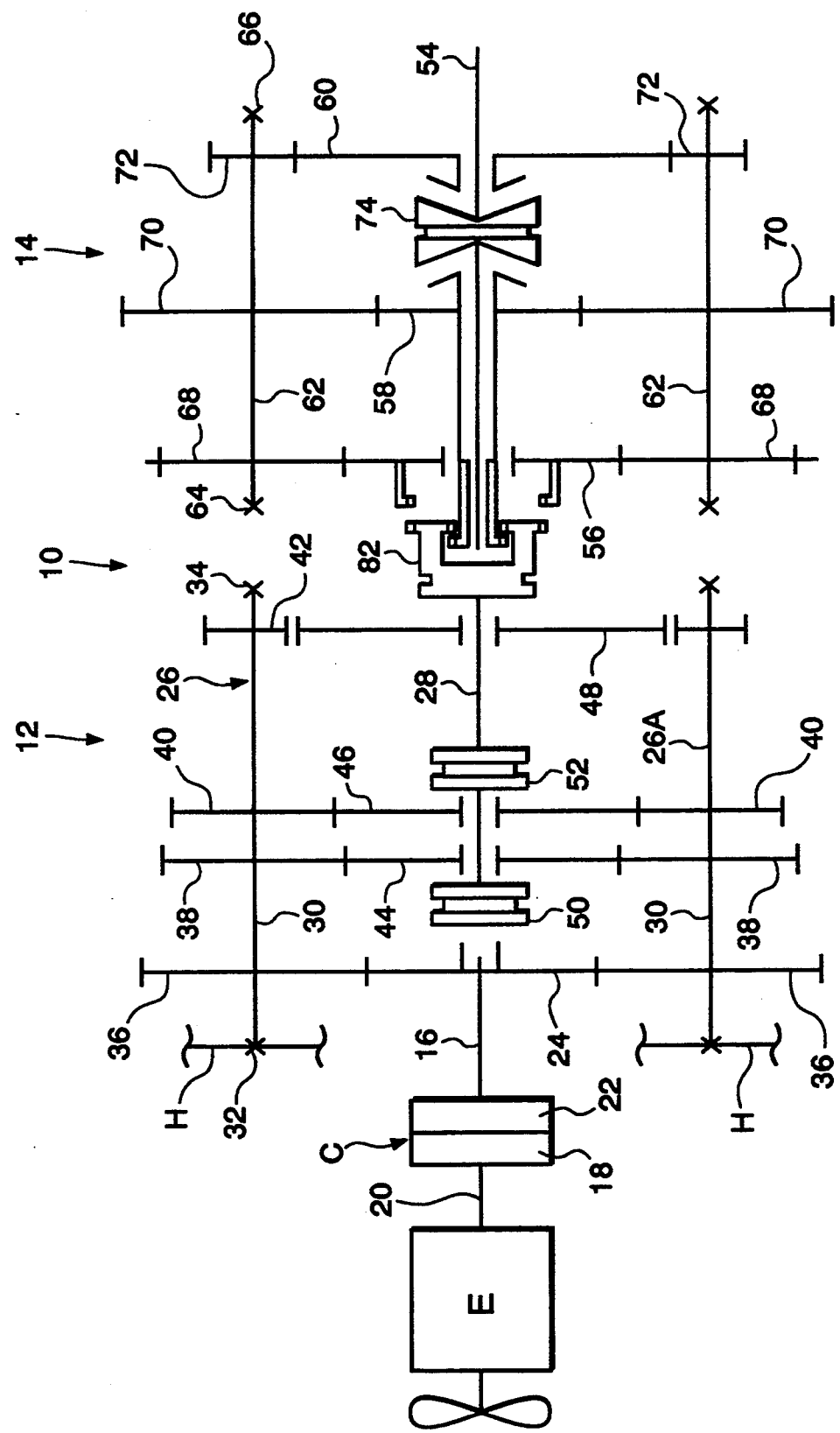
FIG. 1 is a schematic illustration of a compound transmission having a combined range and splitter auxiliary section.

Certain terminology will be used in the following description for convenience in reference only and will not be limiting. The words "upwardly", "downwardly", "rightwardly", and "leftwardly" will designate directions in the drawings to which reference is made. The words "forward" and "rearward" will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation. Relatively large capacity friction means are utilized with the clutch members and are sufficient, upon initiation of a clutch engagement, to cause the clutch members and all members rotating therewith to rotate at substantially synchronous speed.

FIG. 1 shows a ten speed compound transmission 10 according to the present invention. Compound transmission 10 comprises a multiple speed main transmission section 12 connected in series with an auxiliary transmission section 14. Typically, transmission 10 is housed within a single housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In main transmission section 12, the input or mainshaft 16 carries an input gear 24 rotationally fixed thereto for simultaneously driving a plurality of countershaft assemblies at substantially identical rotational speeds. In the transmission 10 illustrated, two substantially identical main section countershaft assemblies 26 and 26A are provided on opposite sides of mainshaft 28, which is generally coaxially aligned with the input shaft 16. Each of the main section countershaft assemblies 26 and 26A comprises a main section countershaft 30 supported by bearings 32 and 34 in housing H, only a portion of which is schematically illustrated. Each of the main section countershafts 30 is provided with an identical grouping of main section countershaft gears 36, 38, 40, and 42 fixed for rotation therewith.

A plurality of main section drive or mainshaft gears 44, 46, and 48 surround the mainshaft 28 and are selectively clutchable, one at a time, to the mainshaft 28 for rotation therewith by sliding clutch collars 50 and 52 as is well known in the art. Clutch collar 50 may also be utilized to clutch input gear 24 to mainshaft 28 to provide a direct drive relationship between input shaft 16 and mainshaft 28. Preferably, each of the main section mainshaft gears encircles the mainshaft 28 and is in continuous meshing engagement with and is floatingly supported by the associated countershaft gear group, which mounting means and special advantages resulting therefrom are explained in greater detail in U.S. Pat. No. 3,105,395 and U.S. Pat. No. 3,335,616, the disclosures of which are hereby incorporated by reference.

Typically, clutch collars 50 and 52 are axially positioned by means of shift yokes or forks (not shown) associated with a shift bar housing assembly, for example as described in U.S. Pat. No. 4,901,600, assigned to the assignee of the present invention and hereby incorporated by reference. Clutch collars 50 and 52 are, in the preferred embodiment, of the well known nonsynchronized double acting jaw clutch type. Jaw clutches 50 and 52 are three-position clutches in that they may be positioned in a centered axially nondisplaced, nonengaged position as illustrated, or in a fully rightwardly engaged or fully leftwardly engaged position by means of a shift lever. As is well known, only one of the clutches 50 and 52 is engageable at a given time and main section interlock means are provided to lock the other clutches in the neutral condition.

Although the present invention is illustrated as a multiple identical countershaft, floating mainshaft and floating mainshaft gear type, and while the auxiliary transmission section of the present invention is particularly well suited for such transmission structure, the advantages of the present invention are applicable to transmissions of the single countershaft or non-identical multiple countershaft type.

Main transmission section 12 preferably provides a reverse speed ratio and three selectable forward speed ratios, although it should be understood that a main transmission section having five or any other number of forward speeds is acceptable. The first and lowest forward speed ratio is provided by drivingly connecting mainshaft drive gear 46 to mainshaft 28. The other two forward ratios, in descending order of reduction ratio provided, are obtained by coupling gears 44 or 24 to the mainshaft 28. Main section mainshaft gear 48 is the reverse gear and is in continuous meshing engagement with countershaft gears 42 by means of conventional intermediate idler gears (not shown). The reverse speed ratio is provided by positioning the clutch 52 to its fully rightward position to drivingly connect the reverse gear 48 to the mainshaft 28.

The auxiliary section 14 includes an output shaft 54 generally coaxial with the mainshaft 28 and having an auxiliary drive gear 56, a splitter gear 58, and a range or reduction gear 60 rotatably mounted thereon. A pair of substantially identical auxiliary section countershafts 62 supported by bearings 64 and 66 in housing H have auxiliary countershaft gears 68, 70 and 72 rotationally fixed thereto. Auxiliary section countershaft gears 68 are constantly meshed with and support auxiliary section auxiliary drive gear 56. Auxiliary section countershaft gears 70 are constantly meshed with and support the splitter gear 58, while auxiliary section countershaft gears 72 constantly mesh with and support reduction gear 60. Accordingly, auxiliary section countershaft gears 68 and auxiliary drive gear 56 define a first gear layer, auxiliary section countershaft gears 70 and splitter gear 58 define a second gear layer, and auxiliary section countershaft gears 72 and reduction gear 60 define a third layer, or gear group, of the auxiliary transmission section 14.

Figure 2:
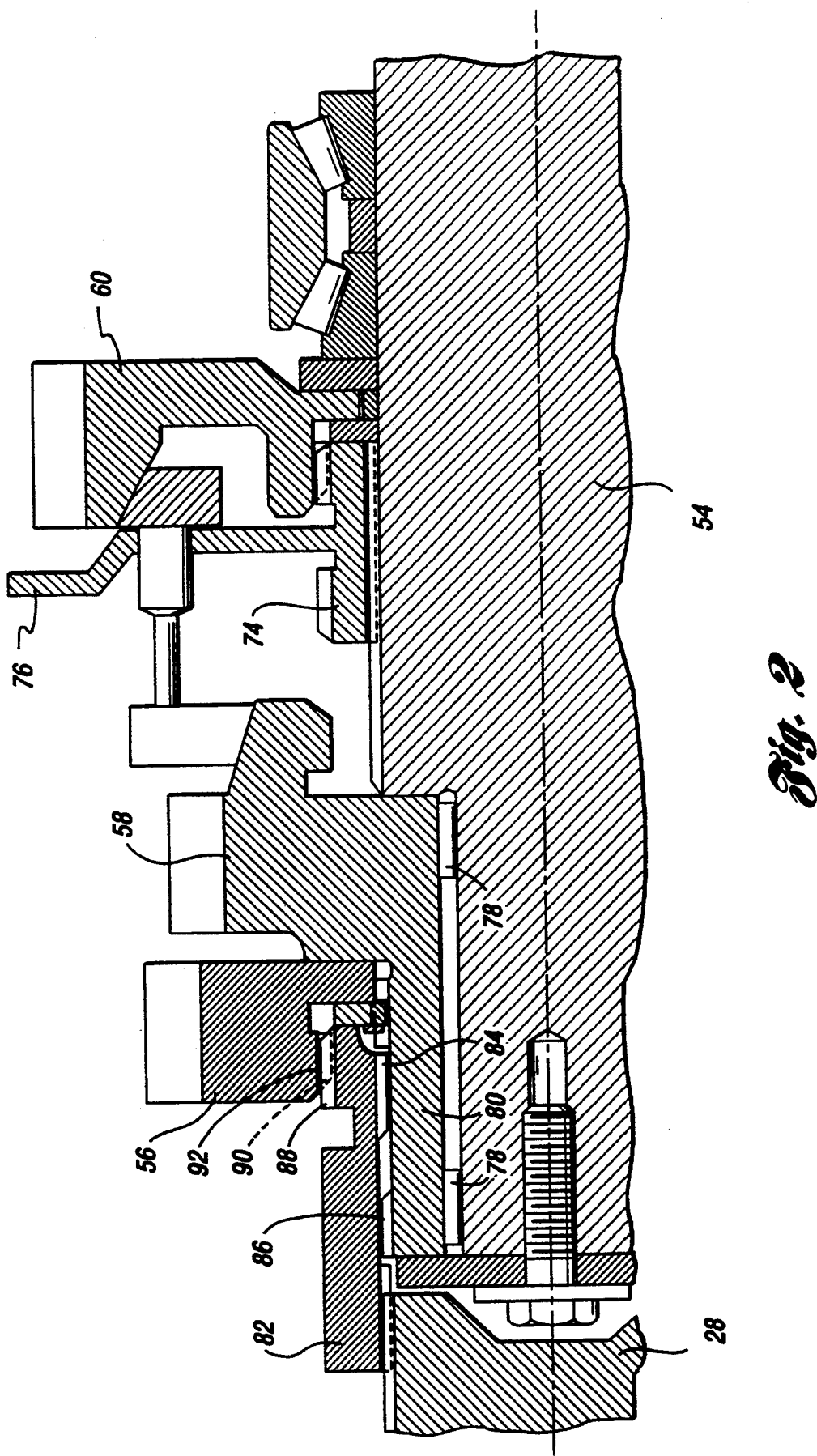
FIG. 2 is a partial sectional view of an auxiliary section of the compound transmission of Figure 1.

As shown particularly in FIG. 2, a synchronized sliding two position clutch assembly 74 is splined or otherwise fixed for rotation with the output shaft 54. The clutch 74 is the range shift clutch utilized for making range shifts in the auxiliary section. The clutch 74 may be selectively located by a shift fork 76 in either a leftwardmost axial position to drivingly couple the splitter gear 58 to the output shaft 54 for high range operation, or in a rightwardmost axial position to rotationally couple reduction gear 60 to the output shaft for low range operation. To accomplish a shifting of the transmission 10 without requiring the operator to actuate any control device other than the gear lever movements, a range control is provided as described in U.S. Pat. No. 5,000,060, assigned to the assignee of the present invention and hereby incorporated by reference.

Auxiliary transmission section 14 is connected in series with main transmission section 12. The splitter gear 58 is rotatably mounted on the output shaft 54 by bushings 78. The auxiliary drive gear 56 is in turn rotatably mounted on a hub or extension 80 of the splitter gear 58. A sliding two position jaw clutch collar 82 is splined on the end of the mainshaft 28 for rotation therewith. Splitter clutch collar 82 may be selectively located in either a leftwardmost or a rightwardmost axial position. In the leftwardmost position, teeth or splines 84 on the inside diameter of the splitter clutch 82 engage teeth or splines 86 on the outside diameter of the extension 80 of the splitter gear 58 to fix the splitter gear for rotation with the mainshaft 28.

In the rightwardmost position as shown in FIG. 2, splines 88 on the outside diameter of the splitter clutch 82 engage splines 90 on an inner diameter surface 92 of auxiliary drive gear 56 to fix the auxiliary drive gear for rotation with the mainshaft 28. Typically, clutch assembly 82 is axially positioned by means of a shift fork (not shown) controlled by a remotely controlled fluid actuated piston assembly. The piston assembly is operable by a driver selection switch such as a button or the like on the shift knob, for example as described in U.S. Pat. No. 5,000,060. The function of double acting sliding jaw clutch collar 82 is substantially identical to the function of jaw clutch collars 50 and 52 utilized in the main transmission section 12.

The auxiliary section 14 is capable of providing four separate ratios to compound any ratios delivered by a main transmission section. The lowest auxiliary section reduction ratio is provided by locating the splitter clutch 82 to its leftwardmost position and the range clutch 74 to its rightwardmost position. The power path thus provided is from mainshaft 28 through the splitter clutch 82 to the splitter gear 58, up through the countershaft gears 70 to the countershafts 62, down through the countershaft gears 72 to the reduction gear 60 and out through the range clutch 74 to the output shaft 54. In this configuration, the splitter gear 58 is a driving gear.

The next lowest auxiliary section ratio is provided by shifting the splitter clutch 82 to the right. The power path is then from mainshaft 28 through the splitter clutch 82 to the auxiliary drive gear 56, up through the countershaft gears 64 to the countershafts 62, down through the countershaft gears 72 to the reduction gear 60 and out through the range clutch 74 to the output shaft 54.

High range ratios are provided by moving the range clutch 74 to the leftwardmost axial position. The third auxiliary section ratio is a direct drive between the mainshaft and the output shaft, and is provided with the splitter clutch 82 back in its leftwardmost position. The power path is then from mainshaft 28 through splitter clutch 82 to the splitter gear 58 to the range clutch 74 and out through the output shaft 54. The fourth auxiliary section ratio is an overdrive ratio, and occurs with the splitter clutch 82 shifted to the right. The torque path provided is from mainshaft 28 to the splitter clutch 82 to the auxiliary drive gear 56 to the countershaft gears 68 to the countershafts 62, down through the countershaft gears 70 to the splitter gear 58 to range clutch 74 and out through the output shaft 54. In this configuration, the splitter gear 58 is a driven gear.

Figure 3:
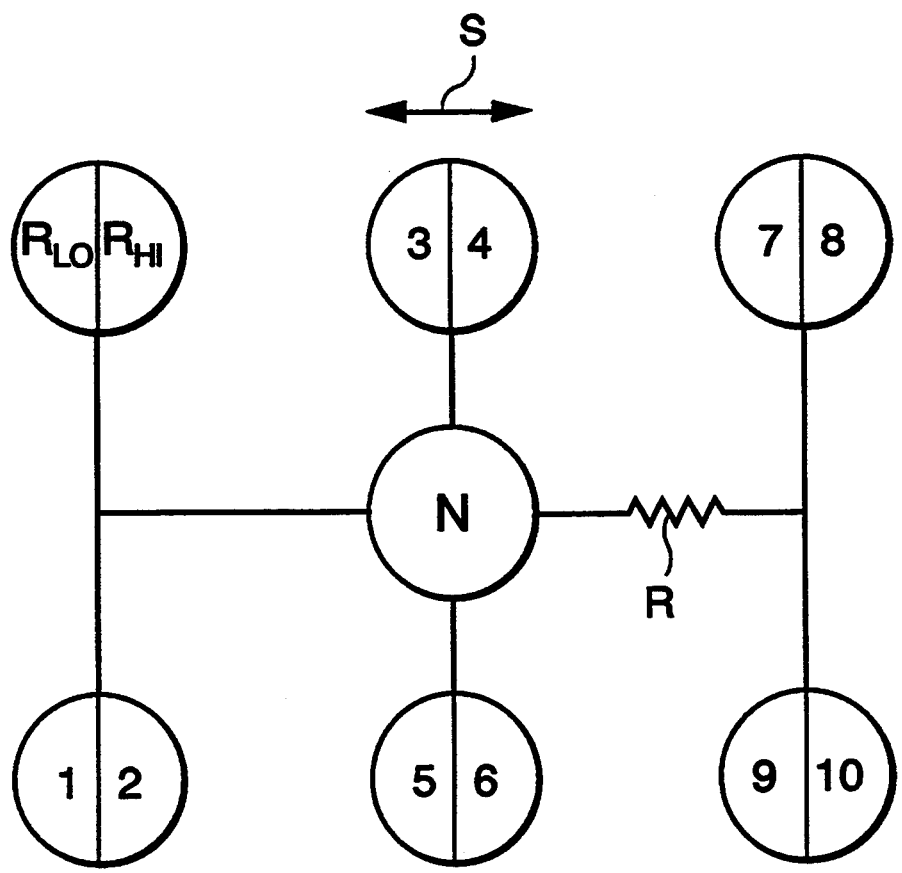
FIG. 3 is a schematic illustration of the shift pattern for the compound transmission.

FIG. 3 shows the shift pattern for the ten speed compound transmission 10. Divisions in the horizontal direction illustrated by arrow S represent splitter shifts. Movement by the operator of a gearshift lever between the lower middle position and the upper right position, through the position indicated by the oscillating line R, causes an automatic range change. All of the six shift pattern positions provide two selectable ratios, including the reverse gear position. In the leftwardmore shift pattern positions, the splitter clutch 82 couples the mainshaft 28 to the splitter gear 58. In the rightwardmore shift pattern positions, the clutch 82 couples the mainshaft 28 to the auxiliary drive gear 56.

The range change occurs when the range clutch 74 moves from engagement with the reduction gear 60 into engagement with the splitter gear 58. Thus, in the first three forward gear shift pattern positions shown in FIG. 3, the range clutch 74 drivingly couples the reduction gear 60 to the output shaft 54. In the fourth and fifth forward gear shift pattern positions to the right of the oscillating line R, the second and third main section forward ratios provided by respectively coupling the gears 44 and 24 to the mainshaft are repeated with the auxiliary section 14 providing a high range compounding ratio. The shift pattern for the compound transmission 10 therefore has a standard 5 speed, non-repeat shift pattern.

Although the present invention has been set forth with a certain degree of particularity, it is understood that various modifications are possible without departing from the spirit and the scope of the invention as hereinafter claimed.

What is claimed is:

1. A compound transmission comprising a main section connected in series with an auxiliary section, the auxiliary section comprising:
   an auxiliary section input shaft having a first clutch rotatable therewith;
   an output shaft having an auxiliary drive gear, splitter gear, and reduction gear rotatably mounted thereon;
   a countershaft having first, second and third countershaft gears rotationally fixed thereto and rotatably engaged with the auxiliary drive gear, splitter gear and reduction gear, respectively; and
   a second clutch rotatable with the output shaft and having a first position for coupling the reduction gear to the output shaft and a second position for coupling the splitter gear to the output shaft;
   the first clutch having a first position for coupling the auxiliary section input shaft to the splitter gear and a second position for coupling the auxiliary section input shaft to the auxiliary drive gear.

2. The compound transmission of claim 1 wherein the auxiliary drive gear is rotatably mounted on an extension of the splitter gear.

3. The compound transmission of claim 1 wherein the splitter gear drives the second countershaft gear when the first clutch is in the first position.

4. The compound transmission of claim 1 wherein a reduction ratio between the auxiliary section input shaft and the output shaft is greater when the reduction gear is coupled to the output shaft than when the splitter gear is coupled to the output shaft.

5. The compound transmission of claim 1 wherein the second clutch is a synchronized range clutch.

6. The compound transmission of claim 1 wherein the auxiliary section input shaft is generally coaxial with the output shaft.

7. The compound transmission of claim 1 wherein the auxiliary section input shaft comprises a mainshaft of the main section.

8. The compound transmission of claim 7 wherein the mainshaft is generally coaxial with the output shaft.

9. The compound transmission of claim 1 wherein the first clutch has internal splines which engage splines on the splitter gear in the first position.

10. The compound transmission of claim 1 wherein the first clutch has external splines which engage splines on the auxiliary drive gear in the second position.

11. A compound transmission comprising:
a main section including:
an input shaft having an input gear rotationally fixed thereto,
a mainshaft having a plurality of drive gears rotatably mounted thereon and a plurality of clutches rotationally fixed thereto for selectively clutching the drive gears to the mainshaft,
at least one countershaft drivable by the input gear, the countershaft having a plurality of countershaft gears rotationally fixed thereto and engaging a corresponding mainshaft drive gear; and
an auxiliary section including:
a first auxiliary section clutch rotatable with the mainshaft,
an output shaft having an auxiliary drive gear, splitter gear, and reduction gear rotatably mounted thereon,
at least one countershaft having first, second and third countershaft gears rotationally fixed thereto and rotatably engaged with the auxiliary drive gear, splitter gear and reduction gear, respectively, and
a second clutch rotatable with the output shaft and having a first position for coupling the reduction gear to the output shaft and a second position for coupling the splitter gear to the output shaft;
the first clutch having a first position for coupling the mainshaft to the splitter gear and a second position for coupling the mainshaft to the auxiliary drive gear.

12. The compound transmission of claim 11 wherein the auxiliary drive gear is rotatably mounted on an extension of the splitter gear.

13. The compound transmission of claim 11 wherein the splitter gear drives the second countershaft gear when the first clutch is in the first position.

14. The compound transmission of claim 11 wherein a reduction ratio between the mainshaft and the output shaft is greater when the reduction gear is coupled to the output shaft than when the splitter gear is coupled to the output shaft.

15. The compound transmission of claim 11 wherein the second clutch is a synchronized range clutch.

16. The compound transmission of claim 11 wherein the mainshaft is generally coaxial with the output shaft.

17. The compound transmission of claim 11 wherein the first clutch has internal splines which engage splines on the splitter gear in the first position.

18. The compound transmission of claim 11 wherein the first clutch has external splines which engage splines on the auxiliary drive gear in the second position.

19. A compound transmission comprising:
a main section providing five selectable forward speed ratios, the main section including:
an input shaft having an input gear rotationally fixed thereto,
a mainshaft having a plurality of drive gears rotatably mounted thereon and a plurality of clutches rotationally fixed thereto for selectively clutching the drive gears to the mainshaft,
at least one countershaft drivable by the input gear, the countershaft having a plurality of countershaft gears rotationally fixed thereto and engaging a corresponding mainshaft drive gear; and
an auxiliary section providing four selectable ratios, the auxiliary section including:
a splitter clutch rotatable with the mainshaft,
an output shaft generally coaxial with the mainshaft and having a splitter gear and a reduction gear rotatably mounted thereon,
an auxiliary drive gear rotatably mounted on an extension of the splitter gear,
at least one countershaft having first, second and third countershaft gears rotationally fixed thereto and rotatably engaged with the auxiliary drive gear, splitter gear and reduction gear, respectively, and
a synchronized range clutch rotatable with the output shaft and having a first position for coupling the reduction gear to the output shaft to provide low range ratios, and a second position for coupling the splitter gear to the output shaft to provide high range ratios;
the splitter clutch having a first position for coupling the mainshaft to the splitter gear and a second position for coupling the mainshaft to the auxiliary drive gear.

20. The compound transmission of claim 19 wherein the splitter clutch has internal splines which engage splines on the splitter gear in the first position.

21. The compound transmission of claim 19 wherein the splitter clutch has external splines which engage splines on the auxiliary drive gear in the second position.

* * * * *